(No Model.) 3 Sheets—Sheet 2.

H. BOLTHOFF.
METHOD OF REDUCING AND DISCHARGING ORES, &c.

No. 312,957. Patented Feb. 24, 1885.

(No Model.) 3 Sheets—Sheet 3.

H. BOLTHOFF.
METHOD OF REDUCING AND DISCHARGING ORES, &c.

No. 312,957. Patented Feb. 24, 1885.

Witnesses: Inventor:

UNITED STATES PATENT OFFICE.

HENRY BOLTHOFF, OF DENVER, COLORADO, ASSIGNOR OF ONE-HALF TO C. F. HENDRIE, OF SAME PLACE.

METHOD OF REDUCING AND DISCHARGING ORES, &c.

SPECIFICATION forming part of Letters Patent No. 312,957, dated February 24, 1885.

Application filed December 19, 1884. (No model.)

*To all whom it may concern:*

Be it known that I, HENRY BOLTHOFF, a citizen of the United States, residing at Denver, in the county of Arapahoe and State of Colorado, have invented new and useful Improvements in Methods of Reducing and Discharging Ores, &c., of which the following is a specification.

In an application for a patent filed by me April 25, 1883, under Serial No. 92,917, for improvements in stamp-mills, I have described, shown, and claimed a stamp-mill having a curvilinearly-reciprocating mortar, in combination with a pestle or stamp operating therein, and the combination, with a pivoted mortar having a discharge-opening, of one or more pestles or stamps operating in said mortar, and mechanism for enabling the mortar to reciprocate curvilinearly, whereby the substance is reduced and automatically discharged during the reducing operation.

The invention which forms the subject of this application embraces the method or process of reducing the material and discharging the same from a mortar of a stamp-mill during the reducing operation, which consists, first, in reducing the material between an oscillating mortar and a stamp; second, in throwing the mass of the substance being reduced at intervals outwardly sidewise from the point of reduction by the sudden arrest of the movement of the mortar, and suddenly throwing the material back again to the point of reduction beneath the pestle or stamp, whereby the mass of the material is agitated or thrown laterally in opposite directions in alternate succession, and the finely-reduced material is discharged at intervals from the mortar on a line aside from the stamp or pestle, and the coarser falls back beneath the stamp for further reduction.

I have shown in the accompanying drawings one type of stamp-mill with which to practice my new process or method by a curvilinearly-reciprocating mortar having a side discharge-opening, and a pestle or stamp and mechanism for enabling the mortar to reciprocate curvilinearly, to which drawings reference is made, and in which—

Figure 1:
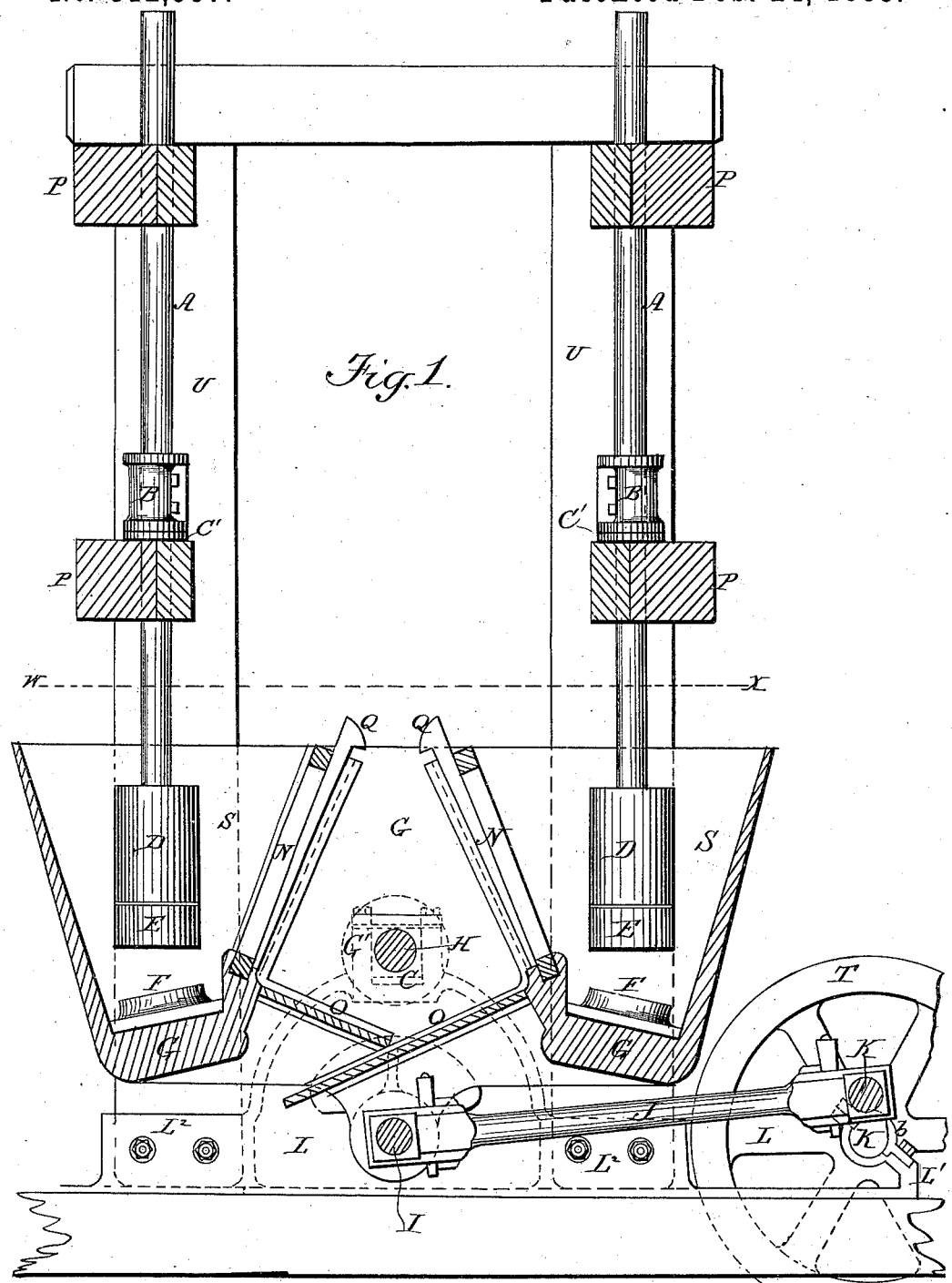
Figure 2:
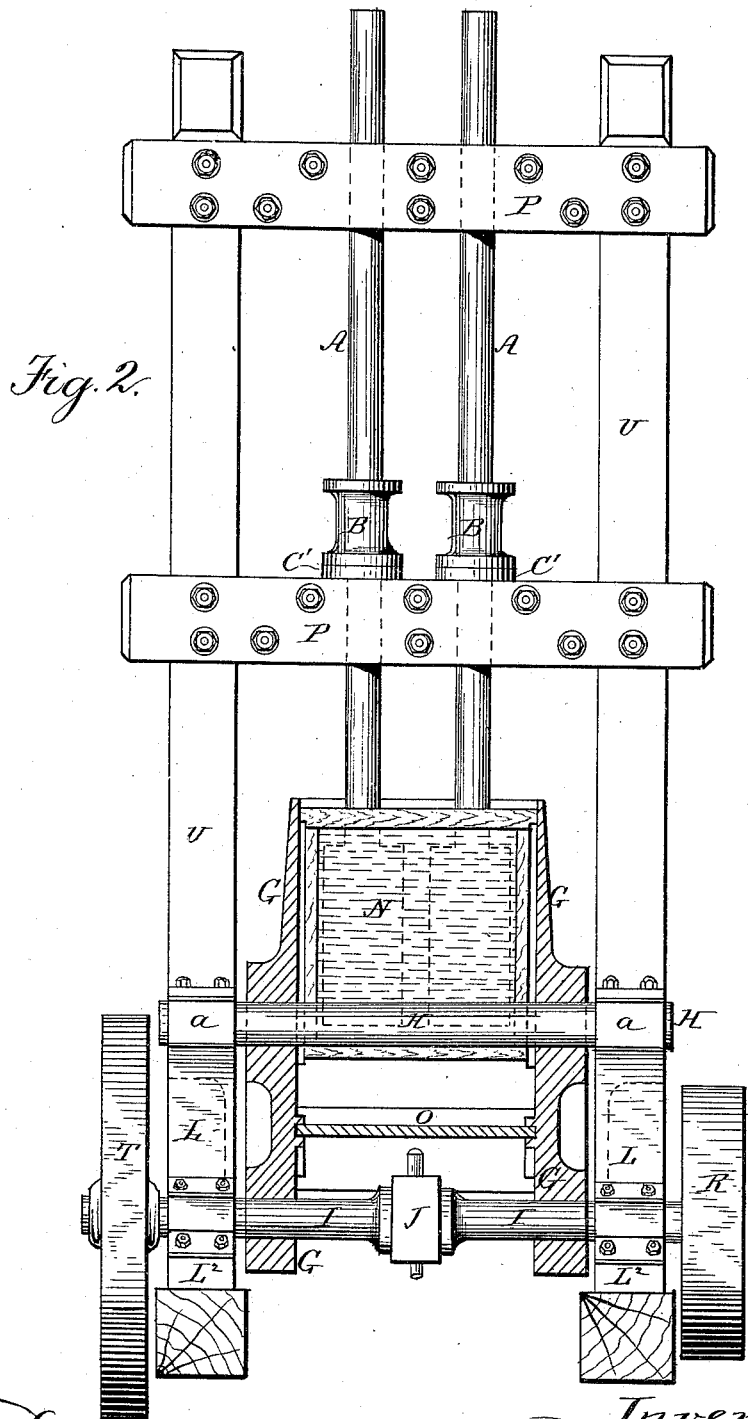
Figure 3:
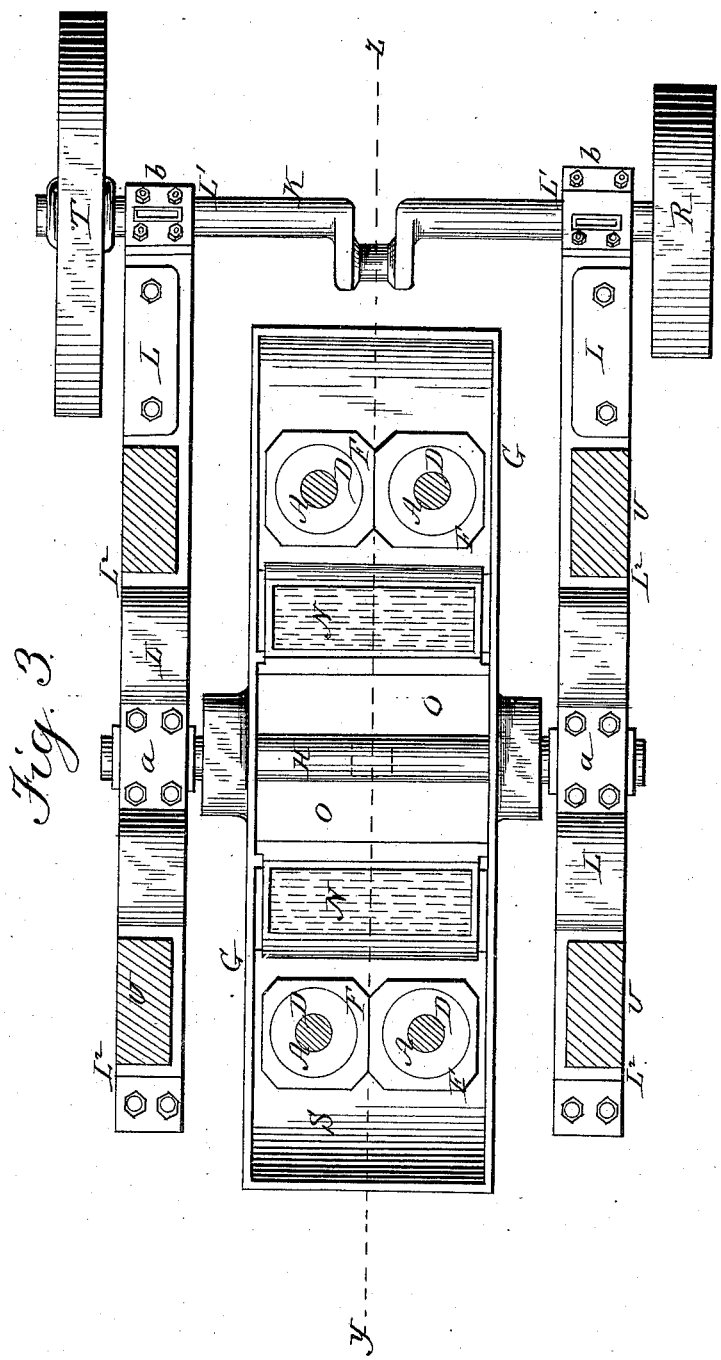

Figure 1 represents a stamp-mill in vertical longitudinal section, in which a curvilinearly-reciprocating mortar is adapted for pestles or stamps operating within each end, forming what might be called a "double-acting mortar." Fig. 2 represents an end sectional elevation of such stamp-mill, showing the bearings of the oscillating mortar and the pitman-connection for operating it; and Fig. 3 represents a top view of the stamp-mill, taken on the line W X of Fig. 1.

The mortar G, as shown, is divided into two compartments, S S, and is oscillated, as will be presently described, upon a shaft or trunnions, H, having bearings in boxes *a a* of the bed-plates L, in extensions G' thereof, said boxes resting on rubber or elastic seatings C, Fig. 1, to prevent jarring said shaft and the parts which operate the mortar. Each compartment S is provided with dies F F, as in the common mortars for stamp-mills, which are replaceable when worn. The stamp or stamps are suspended in a frame above the dies by means of collars B B, resting on rubber or elastic seatings C' C' on the girts P P of said frame, said collars being adjustable on the stamp-stems A A, to permit the upward or downward adjustment of the stamps for increasing or diminishing the force of the blows upon the material to be crushed or reduced, and each stamp-head D has replaceable shoes E, as usual. Each compartment of the mortar is provided with a screen, N, in a frame on the inside, through which the reduced material is discharged, said screens being secured in place by wedges Q Q, so as to be easily removed for repairs or renewal. Below these screens N N aprons O O, of wood or metal, are introduced between the sides of the mortar, over which aprons the reduced stuff or pulp may pass to bins or spouts below, said aprons also serving to protect the working joints of the connecting-rod, which oscillates the mortar, from dust or grit. The sides of the mortar G (see Fig. 2) are extended down to receive the pin or shaft I, which, by means of its connection with the revolving crank K by connecting-rod J, gives the oscillating motion to the mortar, the said crank K receiving its motion from a pulley, R, and belts, or by direct connection with the pitman of an engine, or by hand-crank, as may be desired. The bed-plate supporting the mortar has upward extensions L' L', to receive boxes $b$ $b$ for the crank-shaft, and also has sockets $L^2$ $L^2$, to receive the upright posts U U for the stamp-frame; or the posts may be secured thereon in any suitable manner. The ore or other frangible material to be reduced is fed through a hopper or ore-feeder, (not shown,) by which it is distributed equally to each compartment of the mortar. As many stamps and dies or pestles as are desired may be used. The material is crushed or reduced by reason of the oscillation of the mortar bringing it under and in contact with the heavy stamps suspended above, which latter are thereby forced upward and drop down again into the mortar, the stamps above one compartment rising as that compartment rises, while those above the other fall, the fall being arrested, as before described, by the collars upon the stems meeting the cushioned girts, and at every stroke the oscillation of the mortar distributes the material to be crushed, so that every portion of the mortar's contents receives the pounding action.

It will be understood that the pulverization of the material in the mortar is effected by the force of the blow of the rocking mortar against the suspended stamps, and that the latter are suspended as described, in order that they may form yielding abutments to receive the impact of the stroke or rocking movement of the mortar. The mortar is shown as mounted centrally upon the shaft H, so as to give a full rocking movement of the mortar against the stamps, and the pitman connection therewith is preferably at a point centrally below the bottom of the mortar. The adjustment of the stamps is made to suit the stroke of the mortar. The ore will be fed into the mortar through a hopper having two spouts—one for each compartment. This hopper will be fastened to the frame and feed the ore each way into the compartments when a double mortar is used. A balance-wheel, T, is mounted upon the crank-shaft.

Referring now more particularly to the process or method of reducing and discharging the reduced stuff, it will be seen by an inspection of Fig. 1 of the drawings that the oscillation of the mortar and the sudden arrest of its movement throws the reduced stuff out to one side of a line drawn through the stamp or pestle during the reducing operation, and thereby allows the solid matter to be always returned by the return throw or movement of the mortar beneath the stamp. In this operation the discharge of the finer material is automatic, and is caused by giving the mortar a movement or throw in the arc of a circle and suddenly arresting said movement or throw at the limit of its stroke, and thus causing the finer material to be thrown away from the center of the mortar and the coarser material to be returned in position beneath the reducing-stamp. By the operation described the discharge from the mortar is effected at intervals by the throw of the mortar and during the reducing-blow, while the return of the coarser material beneath the reducing-stamp is also effected at intervals by the return-throw of the mortar, and in this way the operation of discharging is due entirely to the sudden arrest and stoppage of the movement of the mortar, while the operation of placing the coarser material in position to receive the blow of the stamp is due entirely to the equally sudden return movement of the mortar from the point of arrest.

As shown, I have placed the discharging-openings at the inner sides of the mortar, near the center of oscillation, to get a better discharge of the finer material and render the grating more durable, as the oscillation of the mortar will throw the material from the centers of the reducing-chambers toward the inner sides thereof, and from the inner sides back to the centers at intervals, and in succession, thereby keeping the same in intervals of agitation to and from the screens and stamps. I have, however, obtained the same result by placing the screens at the ends of the mortar; but in that case the discharge-gratings were more rapidly cut out by the force of the throw of the material against them. It does not matter whether the mortar be pivoted, as shown, or at the top, so long as it is caused to reciprocate curvilinearly and reduce and discharge the reduced stuff during the operation of reducing in substantially the way described; nor does it matter whether the discharge is effected during the upward throw of the mortar or during its downward throw, because in either case the coarser material will be returned beneath the pestle by an opposite throw of the mortar, whether the latter have a single or double compartment.

As the matters of combination and construction relating primarily to the stamps and curvilinearly-reciprocating mortar herein shown and described form the subject of my said application, hereinbefore referred to, it is only intended by the stamp-mill herein shown and described to illustrate one type of machine adapted for carrying out the method embraced in the following claim.

I claim—

The method herein described of reducing material and discharging the material so reduced from a stamp-mill, which consists, first, in reducing the material between an oscillating mortar and a stamp; second, throwing the mass of material at intervals from the point of reduction to the point of discharge, and then throwing the coarser material back again to the point of reduction, whereby the mass of material is reduced and agitated, or thrown laterally in opposite directions in alternate succession, and the finely-reduced material is discharged at invervals from the mortar on a line aside from the stamp, the coarser material being returned by an opposite sudden throw beneath the stamp for further reduction, substantially as set forth.

In testimony whereof I have hereunto set my hand in the presence of two subscribing witnesses.

HENRY BOLTHOFF.

Witnesses:
HARPER M. ORAHOOD,
CHARLES M. KENDALL.